Oct. 24, 1950 G. W. PENTHENY 2,527,445
TURBINE STEAM SUPPLY CONNECTION
Filed June 2, 1947 4 Sheets-Sheet 1

WITNESSES:
D. J. McCarty
E. H. Lutz

INVENTOR
George W. Pentheny
BY
A. B. Reavis
ATTORNEY

Oct. 24, 1950 — G. W. PENTHENY — 2,527,445
TURBINE STEAM SUPPLY CONNECTION
Filed June 2, 1947 — 4 Sheets-Sheet 2

WITNESSES:
D. J. McCarty
E. H. Lutz

INVENTOR
George W. Pentheny
BY
A. B. Revis
ATTORNEY

Oct. 24, 1950 G. W. PENTHENY 2,527,445
TURBINE STEAM SUPPLY CONNECTION
Filed June 2, 1947 4 Sheets-Sheet 3

INVENTOR
George W. Pentheny
BY
A. B. Reeves
ATTORNEY

Oct. 24, 1950 G. W. PENTHENY 2,527,445
TURBINE STEAM SUPPLY CONNECTION
Filed June 2, 1947 4 Sheets-Sheet 4
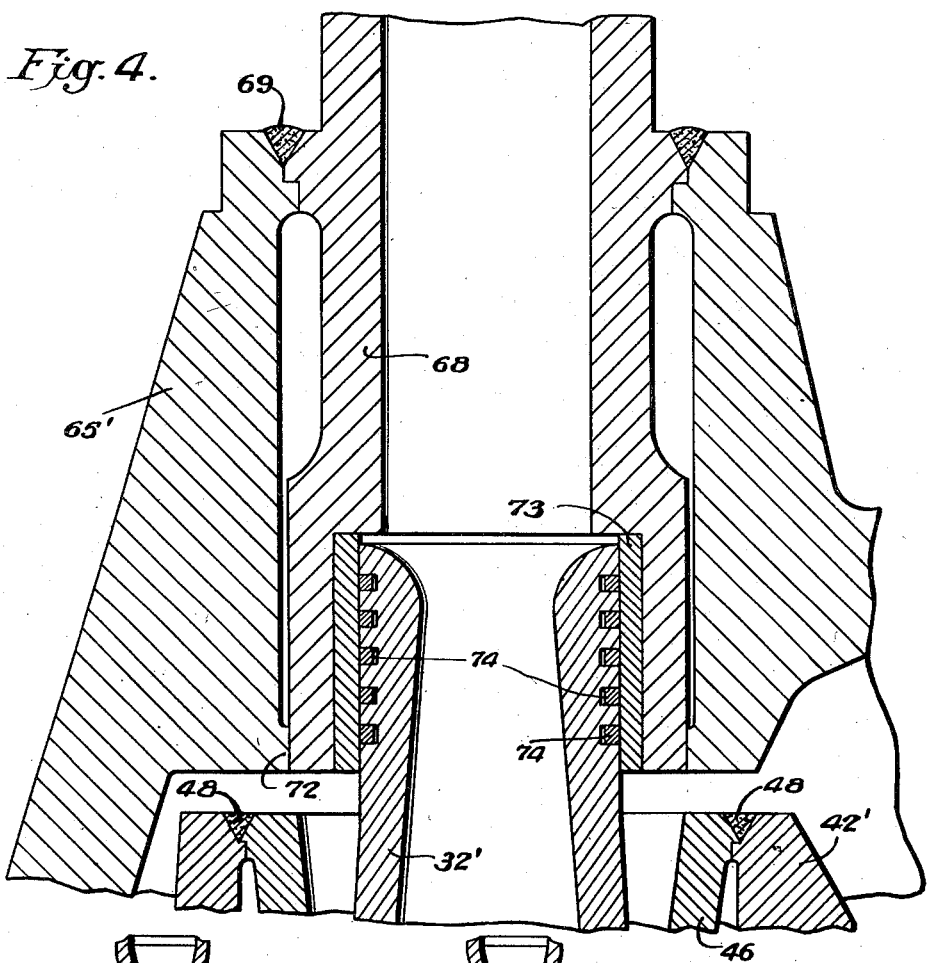
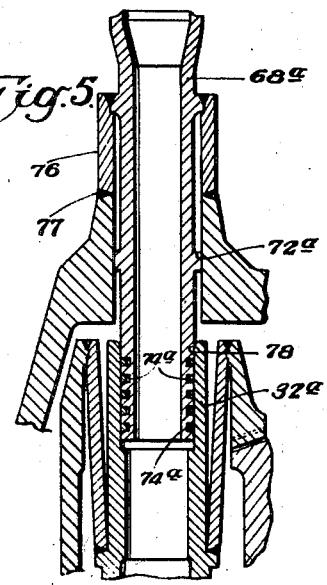
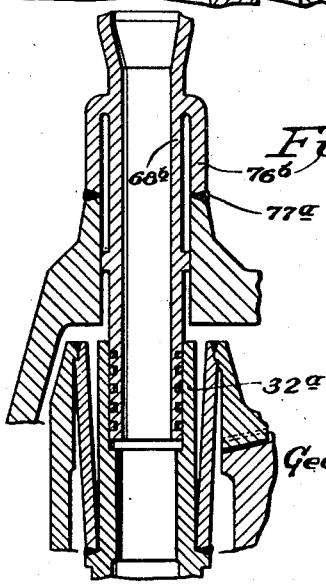
INVENTOR
George W. Pentheny
BY
ATTORNEY Patented Oct. 24, 1950

2,527,445

UNITED STATES PATENT OFFICE 2,527,445

TURBINE STEAM SUPPLY CONNECTION

George W. Pentheny, East Lansdowne, Pa., assignor to Westinghouse Electric Corporation, East Pittsburgh, Pa., a corporation of Pennsylvania Application June 2, 1947, Serial No. 751,801

11 Claims. (Cl. 253—78)

The invention relates to elastic-fluid turbines and it has for an object to provide a conduit extending through the cylinder wall and welded to the latter and to an interior nozzle box and which is constructed and arranged to avoid excessive stresses at the welded joints due to temperature conditions.

A further object of the invention is to provide apparatus of the above character wherein the cylinder and the nozzle box or boxes are provided with lugs which cooperate to allow movements of the nozzle box or boxes accommodating for expansion thereof with respect to the cylinder and relative to each other while holding such nozzle box or boxes aligned or positioned with respect to a plane normal to the turbine axis.

Another object of the invention is to provide a turbine having a circumferential series of nozzle boxes supported within the cylinder by tubular neck portions extending through the cylinder wall for supplying steam to the nozzle boxes and which are connected to the cylinder in such manner that joints directly connecting the high temperature necks to the lower temperature cylinder are avoided.

A further object of the invention is to provide, with a circumferential series of nozzle boxes within a turbine cylinder and supplied with steam by tubular necks extending through elongated cylindrical openings formed in cylinder wall tubular extensions, tubular collars surrounding the necks, each collar having its inner end joined to the corresponding neck and having its outer end connected by an annular weld to the outer end of the tubular extension through whose opening the neck extends.

Another object of the invention is to provide a double-wall turbine cylinder wherein the inner wall encloses a circumferential series of nozzle boxes supplied with steam by conduit structures extending through the walls, each conduit structure comprising conduit portions which have telescopic relation effective between the walls and which are welded in relation to the nozzle boxes and the walls and wherein the walls and the conduit structures are constructed and arranged to avoid excessive stresses at the welded joints due to temperature conditions.

A further object of the invention is to provide, with a turbine having a double-wall cylinder, one or more nozzle boxes within the inner wall and each supplied with steam by means including a tubular neck extending through an opening in the inner wall, a tubular collar having its inner end joined to the neck and having its outer end joined by an annular weld to the inner wall portion bordering the opening, a pipe section extending through an opening formed in the outer wall or cylinder and aligning with the inner wall or cylinder opening and welded to the outer wall, and a joint between the pipe section and the neck and including telescoping pipe section inner end and neck outer end portions.

Another object of the invention is to provide a turbine having a cylinder comprising inner and outer walls restrained against relative axial displacement with nozzle boxes disposed within the inner wall and which are supplied with steam by means welded to the inner and outer walls in such manner as to guard against high temperature differentials across the welds and the nozzle boxes are free to expand radially and circumferentially while being maintained aligned or positioned with respect to a plane normal to the turbine axis.

These and other objects are effected by the invention as will be apparent from the following description and claims taken in connection with the accompanying drawing, forming a part of this application, in which:

Fig. 4 is a detail view showing one of the nozzle box connections of Fig. 3 drawn to larger scale; and Figs. 5 and 6 are views similar to Fig. 4, but showing modified forms of nozzle box connections.

Figure 1:
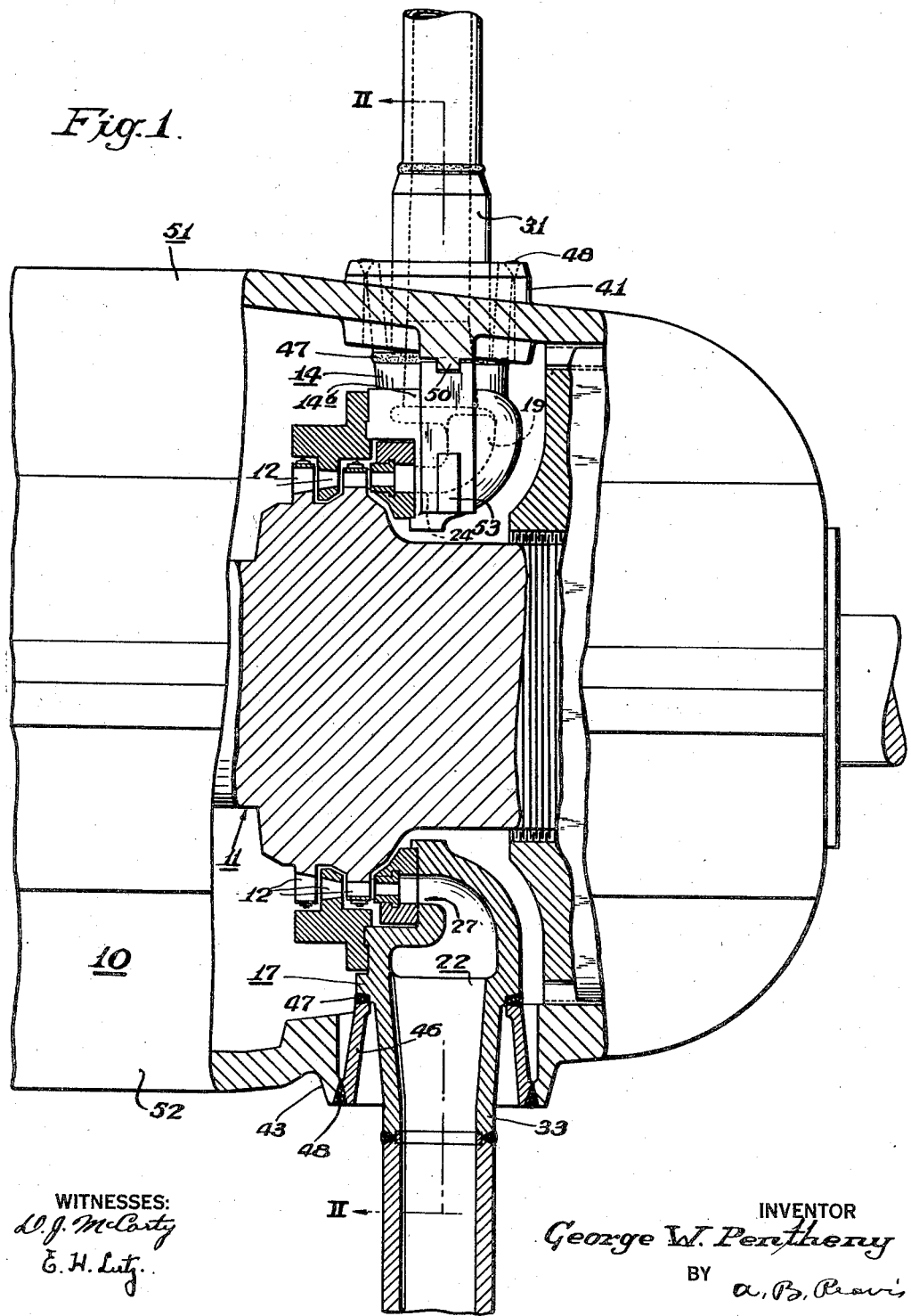
Fig. 1 is a fragmentary view, partly in section and partly in elevation, showing the high-pressure end of the improved turbine.

In the drawings, there is shown a turbine cylinder, at 10, and a rotor, at 11, provided with blading 12. Nozzle boxes 14, 15, 16, 17 and 18 are disposed within the high pressure end of the cylinder and have chambers 19, 20, 21, 22 and 23 and groups of nozzles 24, 25, 26, 27 and 28 for supplying elastic fluid to the blading.

Tubular necks 30, 31, 32, 33 and 34 integral with the nozzle boxes 14, 15, 16, 17 and 18, respectively, extend through openings 35, 36, 37, 38 and 39 of tubular extensions 40, 41, 42, 43 and 44.

Tubular collars or conical sleeve members 46, encompassing the necks, have their inner ends joined to the latter, preferably by annular welds 47, and have their outer ends joined to the outer ends of the tubular extensions by annular welds 48. The collars 46 hold the tubular necks in coaxial or centered relation with respect to the openings.

As the nozzle boxes are individually supported from the turbine cylinder by their tubular necks, they are free to expand and contract radially and circumferentially with respect to the cylinder. The cylinder and the nozzle boxes are provided with circumferentially-arranged lugs or tongue-and-groove connections 50 which cooperate to hold the nozzle boxes in alignment.

Figure 2:
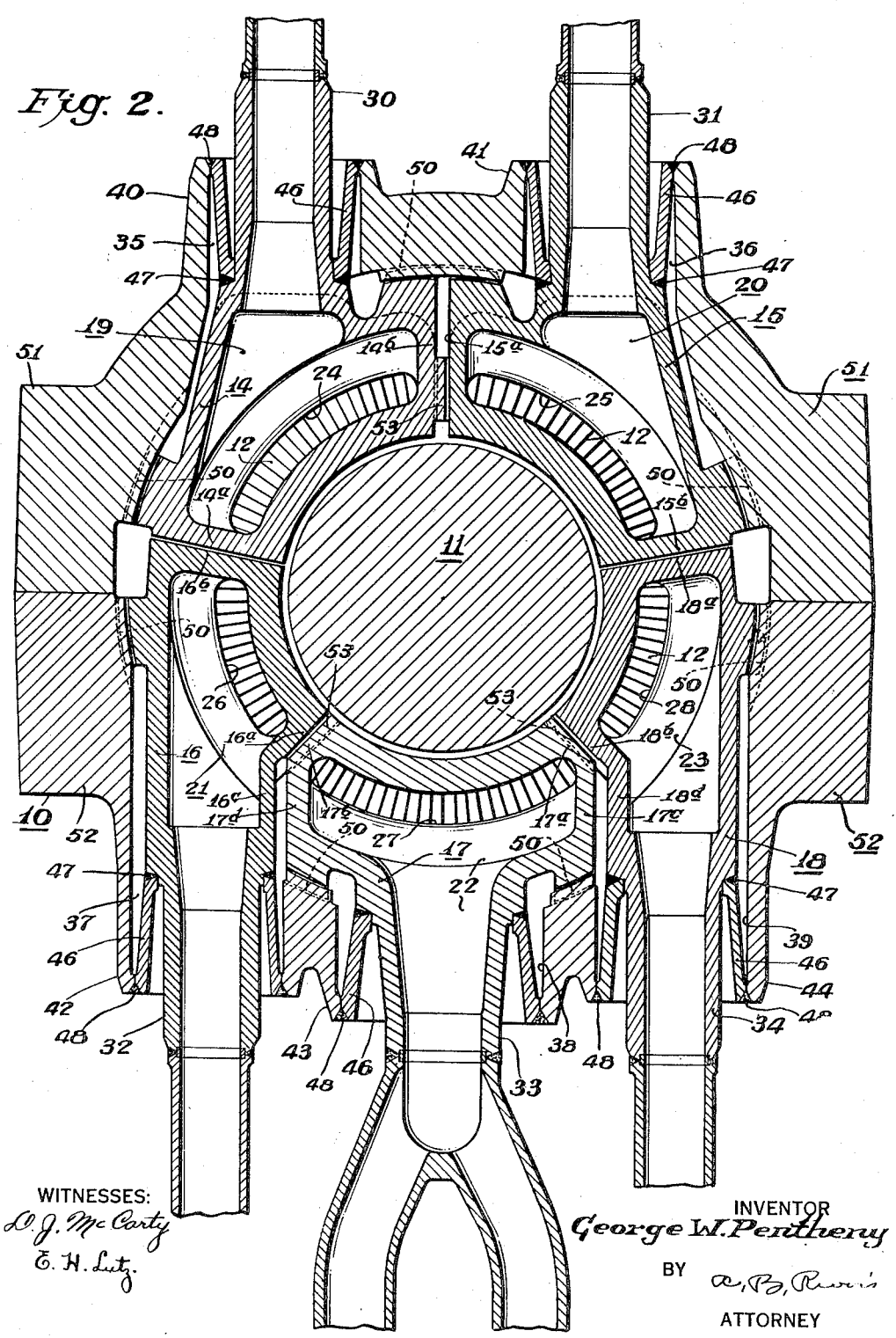
Fig. 2 is a sectional view taken along the line II—II of Fig. 1.

The turbine cylinder, at 10, comprises an upper half 51 and a lower half 52, the halves having flanged portions fastened together in the usual way by means of bolts (not shown in Figs. 1 and 2).

The nozzle boxes 14 and 15 are arranged as an upper group carried by the upper cylinder half 51, and the boxes 16, 17 and 18 are arranged as a lower group carried by the lower cylinder half 52.

The tubular necks 30 and 31 of the upper nozzle group and the openings 35 and 36 are parallel, and the same is true with respect to the lower cylinder half openings and the tubular necks of the nozzle boxes of the lower group.

The nozzle boxes have juxtaposed ends and are separated by suitably small clearance spaces so that they may expand independently. Also, the ends are so formed that the nozzle boxes may be assembled with respect to the upper and lower halves. Accordingly, the nozzle boxes 14, 15, 16, 17 and 18, respectively, have radial end portions 14a, 14b, 15a, 15b, 16a, 16b, 17a, 17b, 18a and 18b.

While the juxtaposed ends of the upper group nozzle boxes extend radially, where, as shown, the upper group is comprised by a pair of boxes, the tubular necks 30 and 31, the openings 35 and 36 and the cylinder boss structures 40 and 41 are preferably in parallel relation to the juxtaposed radial ends 14b and 15a. Likewise, the juxtaposed ends of the nozzle boxes of the lower group have portions 16c—17d and 17c—18d which extend parallel to the tubular necks 32, 33 and 34 and the openings 37, 38 and 39 formed in the cylinder boss structures 42, 43 and 44.

The juxtaposed ends of the nozzle boxes of each of the upper and lower groups have cooperating lugs or tongue-and-groove connections 53. The circumferential lugs 50 provide for circumferential confinement of the nozzle boxes, holding the entire circumferential series in alignment, and the lugs 53 function in this respect so far as each of the upper and lower groups is concerned. The lugs 50 and 53, each and in combination, confine movements of the nozzle boxes of the upper group to a plane which is normal to the turbine axis, whereby the nozzle boxes may expand and contract while being held in proper relation to the blading, and the sets of lugs 50 and 53 for the nozzle boxes of the lower group function in the same way.

The nozzle boxes of the upper and lower groups may be readily assembled with the lugs or tongue-and-groove connections 50 and 53 interfitting, the necks 30, 31, 32, 33 and 34 and the collars 46 attached thereto extending through the openings 35, 36, 37, 38 and 39, in which position the nozzle boxes are attached to the upper and lower cylinder halves by means of the annular welds 48.

From the foregoing, it will be apparent that the nozzle box supply conduits are welded to the cylinder in such manner that the welds do not directly join the high temperature conduits to the lower temperature cylinder. While the inner ends of the collars are welded to the tubular necks, such collars are tapered or are of frusto-conical shape so as to be spaced both from the inner walls of the openings and from the necks, whereby heat is dissipated, and this, with adequate length of the collar, assures of a substantial temperature gradient from the inner to the outer ends of the collars, with the result that the temperature difference across the annular welds 48 is substantially less than would be the case if such welds connected the tubular necks directly to the cylinder. Also, the collar may expand circumferentially along its length to a variable extent, depending upon its temperature, with the result that its inner end, nearly at the temperature of the neck, and its outer end, nearly at the temperature of the cylinder, expand and contract with the neck and with the cylinder, respectively, in consequence of which the stresses to which the welds are subjected may be kept within reasonable bounds. Furthermore, the collars introduce compensating expansion and contraction effects. While expansion of the cylinder tubular extensions 40, 41, 42, 43 and 44 tends to pull the tubular necks and the nozzle boxes outwardly, this tendency is counteracted by the inward expansion of the collars. The circumferential lug or tongue-and-groove connections 50 hold the nozzle boxes aligned axially and circumferentially while accommodating for radial movement thereof with respect to the cylinder. The ends of the nozzle boxes are juxtaposed with intervening clearances providing for circumferential expansion. While the nozzle boxes of both the upper and lower cylinders are free for independent expansion and contraction both radially and circumferentially, it will be apparent that such boxes are maintained in alignment by means of the interfitting lugs or tongue-and-groove connections 50 and 53.

In Figs. 3, 4, 5 and 6, the structure described is carried forward and embodied in a turbine of the double-wall type, the cylinder structure including inner and outer walls, at 55 and 56, held against relative axial displacement by circumferentially-extending key connections 57. The inner wall is supported from the outer wall by detachable key structures 57a. The purpose of the double wall is the usual one of avoiding subjection of a single wall to extreme pressure and temperature differences, elastic fluid being maintained in the space between the walls at a pressure and temperature lower than the admission temperature and pressure.

The inner cylinder is comprised by upper and lower halves 58 and 59 connected by studs 60, and the outer cylinder includes upper and lower halves 61 and 62 joined by bolts 63. The relationship and connections of the nozzle boxes to the inner cylinder are similar to those already described except that the upper and lower groups of nozzle boxes are alike, and each group is similar to the lower group of Figs. 1 and 2.

Figure 3:
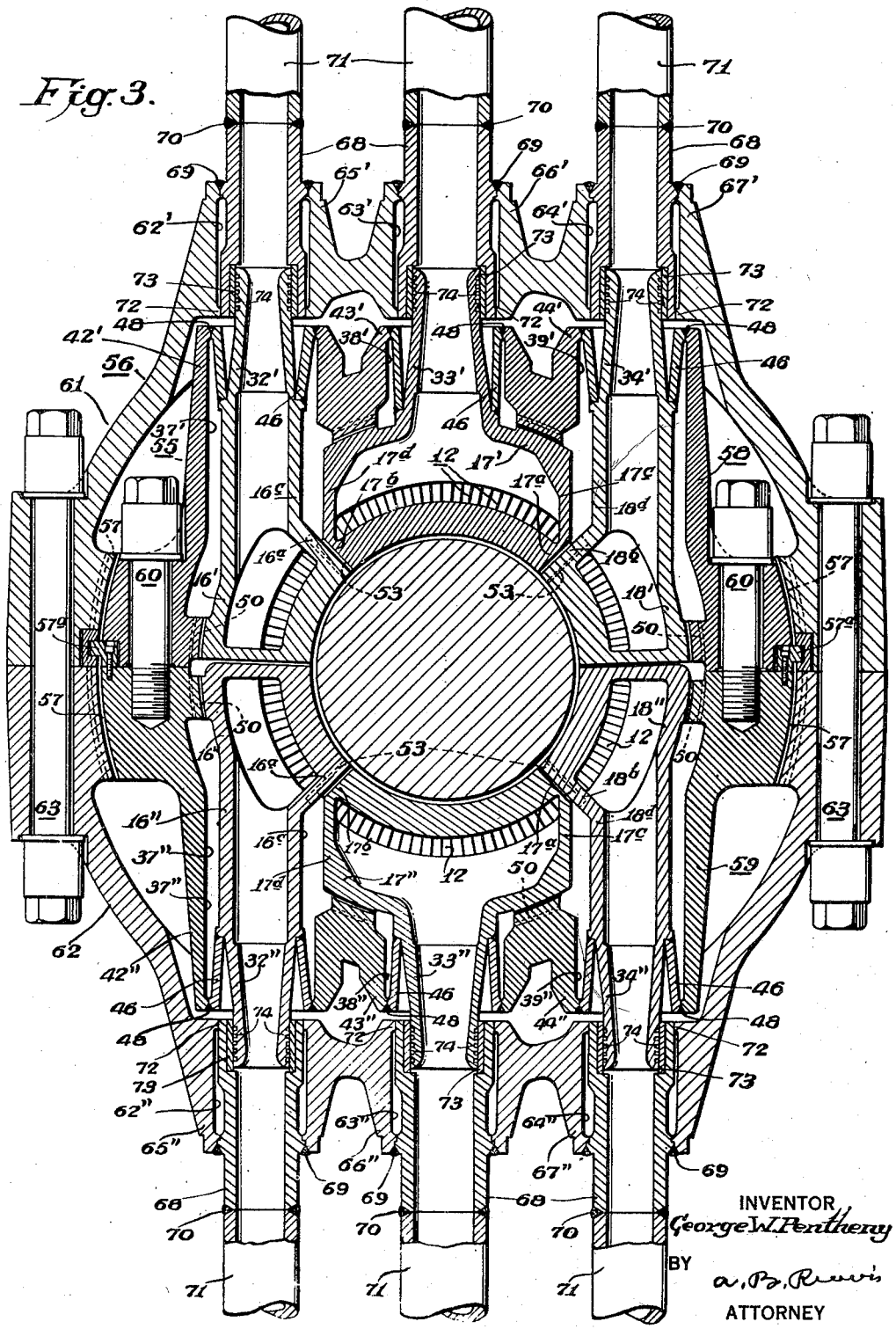
Fig. 3 is a transverse sectional view, similar to Fig. 2, and showing the invention embodied in a double-walled cylinder.

In Fig. 3, the upper cylinder half 58 carries nozzle boxes 16', 17' and 18', and the lower cylinder half 59 carries nozzle boxes 16'', 17'' and 18''. As in Fig. 1, the nozzle boxes have circumferential lug or tongue-and-groove connections 50 with respect to the inner cylinder to maintain alignment thereof while allowing for radial movement relative to the cylinder. The ends of the boxes are juxtaposed radially with small intervening clearances for circumferential expansion and the juxtaposed ends 16a—17b and 17a—18b are joined by the lug or key connections 53 serving the purpose already described.

As in Fig. 1, the openings 37', 38', 39', 37'', 38'', and 39'' for the nozzle box tubular necks of Fig. 3 are formed in inner wall or cylinder tubular extensions, the upper cylinder half having tubular extensions 42', 43' and 44', and the lower cylinder half having tubular extensions 42'', 43'' and 44''. Tapered or conical sleeve-like collars 46 are joined to the tubular necks 32', 33', 34', 32'', 33'' and 34'', extend through the tubular openings, and have their outer ends joined by annular welds 48 to the outer ends of the tubular extensions.

The outer cylinder, at 56, has its upper half provided with openings 62', 63', and 64' aligned with the openings 37', 38', and 39', and the lower half has openings 62'', 63'' and 64'' aligned with the openings 37'', 38'' and 39''. Preferably, the openings 62', 63' and 64' are formed in the tubular extensions 65', 66' and 67' of the upper half of the outer cylinder or wall, and the openings 62'', 63'' and 64'' are formed in the tubular extensions 65'', 66'' and 67'' of the lower half of the outer cylinder or wall.

Short pipe sections 68 extend through the outer cylinder openings 62', 63', 64', 62'', 63'' and 64'' and are connected by annular welds 69 to the outer ends of the tubular extensions 65', 66', 67', 65'', 66'' and 67''. The outer ends of the pipe sections are connected by welds 70 to steam pipes 71. The inner ends of the pipe sections are guided by ribs 72 for expansion and contraction while being held thereby in coaxial relation with the cylinder openings, and such inner ends are telescoped in relation to the outer ends of the nozzle box tubular necks 32', 33', 34', 32'', 33'' and 34''. The welds 69 and the ribs 72 hold the pipe sections centered in the outer wall boss openings and, through the telescopic joints, the inner ends of the pipe sections hold the outer ends of the necks.

In Fig. 3, the guide ribs 72 are integral with the cylinder and the inner ends of the pipe sections telescope over the outer ends of the tubular necks. The inner ends of the pipe sections are slightly enlarged to receive bushings 73 and piston rings 74 carried by the tubular necks cooperate therewith to seal the telescopic joint.

As shown in Figs. 3 and 4, the tubular necks converge outwardly so that the outer ends thereof may telescope within the pipe sections. Because of the consequent reduction in flow area, the bores of the necks are each formed with a Venturi passage which converges from the flow area of the pipe section to the smaller throat area and then diverges from the latter to the flow area of larger section. Conversion of pressure into velocity in the convergent portion of the passage followed by conversion of velocity into pressure in the divergent portion thereof assures of such high velocity at the throat that a large flow is preserved even though the flow area is reduced to a considerable extent because of the joint structure.

In Fig. 5, there is shown a modified form of double-wall cylinder wherein the cylindrical bosses or extensions are constituted by tubular elements 76 formed separately from the cylinder and welded thereto, at 77, and the pipe sections 68a which extend through the openings of the outer cylinder are modified. Each pipe section has a rib 72a by which it is guided by the cylinder opening and the inner end is formed to telescope within the outer end of the tubular neck 32a. Piston rings 74a carried by the inner end of the pipe section fit within the cylindrical bore 78 at the outer end of the tubular neck.

Fig. 6 shows a further modified form wherein each pipe section 68b is formed with an integral skirt 76b serving the purpose of the boss structure 76 of Fig. 5, and the inner end of the skirt is joined by the annular weld 77a to the cylinder.

From the foregoing, it will be apparent that, in accordance with the invention, nozzle boxes are arranged within a cylinder and are supplied with steam by tubular necks extending through the cylinder wall and connected to the latter so as to support the nozzle boxes from the cylinder, the connections of the tubular necks to the cylinder being such that the joints to the cylinder are relieved of high temperature differences, that is, the tubular neck of each nozzle box has a collar joined at one end thereto, and the other end of the collar is connected to the cylinder by an annular weld. Where the invention is applied to a turbine of the double wall or cylinder type, the nozzle boxes are carried by the inner cylinder in the manner just described, and pipe sections extend through the outer cylinder and are connected to the latter by means of tubular extensions extending outwardly from the cylinder and having their outer ends joined to the pipe sections whose inner ends are centered or steadied in the tubular extension openings and are connected telescopically to the outer ends of the tubular necks of the nozzle boxes carried by the inner cylinder, whereby the necks and pipe sections are free for relative movement due to expansion effects and the necks are held against lateral movement by the pipe sections. Thus, in all cases, the steam connections are welded or held in hermetically-sealed relation with respect to the turbine cylinder wall or walls in such manner that the welded joints are not subjected to the prevailing temperatures of the connections and the cylinder or cylinders, and, therefore, to different extents of expansion which would tend to cause high stresses in the joints. Where outer boss structure ends are joined to high temperature parts, as with the pipe sections of the outer wall or cylinder, such outer boss ends are capable of being uniformly and quickly heated by such high temperature parts, with the result that expansion differences, and, therefore, joint stresses are not so great as would be the case if the joint directly connected a high temperature part to the cylinder proper. On the other hand, where, in addition to avoidance of large temperature differences across joints, the structures are required to fulfill a positioning function, as with the nozzle boxes, a tubular collar is joined, at its inner end, to each nozzle box tubular neck and, at its outer end, to the outer end of the box structure through whose opening the neck extends. With the nozzle boxes supported so as to be capable of expansion and contraction, both radially and circumferentially, the provision of tongue-and-groove or lug connections between the cylinder and the bosses and between juxtaposed ends of the nozzle boxes of the upper and lower groups, provides for such expansion while maintaining alignment of the nozzle boxes as well as positioning thereof with respect to a plane normal to the turbine axis.

While the invention has been shown in several forms, it will be obvious to those skilled in the art that it is not so limited, but is susceptible of various other changes and modifications without departing from the spirit thereof.

What is claimed is:

1. In an elastic-fluid turbine, a cylinder, a rotor, blading carried by the cylinder and rotor, and means for supplying elastic fluid to the blading; said means comprising a nozzle box including a chamber and a group of nozzles for supplying elastic fluid from the latter to the blading, a tubular neck integral with the nozzle box for supplying elastic fluid to the chamber and extending through an opening formed in the cylinder, a tubular collar joined at its inner end to the exterior of the tubular neck and extending outwardly in the opening, and an annular welded connection between the outer end of the collar and the portion of the cylinder bounding the outer end of the opening.

2. Apparatus as claimed in claim 1 wherein the opening formed in the cylinder is bounded by an outwardly-extending tubular extension and wherein the ends of the collar are connected by annular welds to the neck and to the tubular extension.

3. In an elastic-fluid turbine, a cylinder, a rotor, blading carried by the cylinder and rotor, and means for supplying elastic fluid to the blading; said means comprising a nozzle box including a chamber and a group of nozzles for supplying elastic fluid from the chamber to the blading; a tubular neck integral with the box for supplying elastic fluid to the chamber and extending through an opening formed in the cylinder; a tubular collar joined at its inner end to the exterior of the tubular neck, extending outwardly in the opening, and joined at its outer end to the cylinder; and guide means between the cylinder and the nozzle box and accommodating for radial and circumferential expansion movements of the latter.

4. In a turbine, a cylinder including upper and lower halves, a rotor, blading carried by the cylinder and the rotor, and means for supplying elastic fluid to the blading; said means comprising a circumferential series of nozzle boxes including an upper group for the upper half of the cylinder and a lower group for the lower half of the cylinder, each nozzle box including a chamber and a group of nozzles, tubular necks integral with the nozzle boxes and extending through openings formed in the upper and lower cylinder halves, tubular collars encompassing the necks in the openings, an annular welded connection between the inner end of each collar and its associated neck, an annular welded connection between the outer end of each collar and the portion of the cylinder bounding the outer end of the opening within which it is located, lugs carried by the upper and lower cylinder halves, and by the nozzle boxes for maintaining alinement of the latter, said nozzle boxes having ends which extend radially with respect to the rotor and which are juxtaposed with sufficient circumferential clearance to accommodate for circumferential expansion of the nozzle boxes, and lugs carried by the juxtaposed ends of the nozzle boxes of each of the upper and lower groups and cooperating to confine movements of the nozzle boxes to a plane normal to the turbine axis.

5. In an elastic-fluid turbine, a cylinder, a rotor, blading carried by the cylinder and rotor, and means for supplying elastic fluid to the turbine; said means comprising a circumferential series of nozzle boxes within the cylinder and each nozzle box including a chamber and a group of nozzles for supplying elastic fluid from the latter to the blading, tubular necks integral with the respective nozzle boxes and extending through openings formed in the cylinder for supplying elastic fluid to the nozzle box chambers, tubular collars having their inner ends joined to their respective necks and extending outwardly about the latter and within said openings, and annular welded connections between the outer ends of the collars and portions of the cylinder bordering the openings.

6. In an elastic-fluid turbine, a cylinder, a rotor, blading carried by the cylinder and rotor, and means for supplying elastic fluid to the turbine; said means comprising a circumferential series of nozzle boxes within the cylinder and each nozzle box including a chamber and a group of nozzles for supplying elastic fluid from the latter to the blading, tubular necks integral with the respective nozzle boxes and extending through openings formed in the cylinder for supplying elastic fluid to the nozzle box chambers, tubular collars having their inner ends joined to their respective necks and extending outwardly about the latter and within said openings, tubular extensions integral with the cylinder and bordering said openings, annular welded connections between the outer ends of the collars and of said tubular extensions, and lugs provided within the cylinder and on the nozzle boxes and cooperating to accommodate for radial and circumferential movements of the nozzle boxes while maintaining the latter aligned circumferentially.

7. In an elastic-fluid turbine, a cylinder including an inner wall supported from an outer wall, a rotor, blading carried by the inner wall and by the rotor, and means for supplying elastic fluid to the blading; said means comprising a circumferential series of nozzle boxes within the inner wall, each nozzle box including a chamber and a group of nozzles for supplying elastic fluid therefrom to the blading, tumular necks integral with the respective nozzle boxes and extending through first openings provided in the inner wall, means for supporting the nozzle boxes from the inner wall and for sealing the first openings about the necks, the last-named means including collars unitary with the necks and welded joints between the collars and portions of the inner wall bordering the first openings, pipe sections extending through second openings formed in the outer wall and aligning with the first openings, means for supporting the pipe sections from the outer wall and for sealing the second openings about the pipe sections, said last-named means including annular portions unitary with the pipe sections and annular welded joints between such annular portions and portions of the outer wall bordering the second openings, and means for joining the pipe sections and the tubular necks and including telescoping pipe section inner end and tubular neck outer end portions.

8. In an elastic-fluid turbine, a cylinder including an inner wall supported from an outer wall, a rotor, blading carried by the inner wall and by the rotor, and means for supplying elastic fluid to the blading: said means comprising a circumferential series of nozzle boxes each including a chamber and a group of nozzles for supplying elastic fluid from the latter to blading; aligned openings formed in the inner and outer walls; tubular extensions integral with said inner and outer walls and bordering said openings thereof; tubular necks unitary with the nozzle boxes, opening into the chambers of the latter, and extending through the inner wall tubular extension openings; tubular collars having their inner ends joined to the necks; annular welds joining the outer ends of the collars and of the inner wall tubular extensions; elastic fluid supply pipe sections extending through the outer wall tubular extension openings; annular joints unitarily connecting the outer ends of the outer wall boss structures and the pipe sections; means for holding the pipe sections centered with respect to the inner ends of the outer wall tubular extension openings; and telescopic joints between the inner ends of the pipe sections and the outer ends of the tubular necks.

9. In an elastic-fluid turbine, a cylinder including an inner wall supported from an outer wall, a rotor, blading carried by the inner wall and by the rotor, and means for supplying elastic fluid to the blading: said means comprising a circumferential series of nozzle boxes each including a chamber and a group of nozzles for supplying elastic fluid from the latter to blading; aligned inner and outer wall tubular structures extending externally of the inner and outer walls; each pair of aligned tubular structures having coaxial openings; tubular necks unitary with the nozzle boxes, opening into the chambers of the latter, and extending through the inner wall tubular structure openings; tubular collars having their inner ends joined to the necks; annular welds joining the outer ends of the collars to the outer ends of the inner wall tubular structures; elastic fluid supply pipe sections extending through the outer wall tubular structure openings; annular joints unitarily connecting the outer ends of the outer wall tubular structures and the pipe sections; means for holding the pipe sections centered with respect to the inner ends of the outer wall tubular structure openings; telescopic joints between the inner ends of the pipe sections and the outer ends of the tubular necks; and lugs provided within the inner wall and on the nozzle boxes for maintaining the latter in alignment.

10. In an elastic-fluid turbine, a cylinder including an inner wall supported from an outer wall and each wall comprising joined halves, a rotor, blading carried by the inner wall and by the rotor, and means for supplying elastic fluid to the blading: said means comprising a circumferential series of nozzle boxes within the inner wall and including groups for the respective halves of the latter; aligned inner and outer wall tubular structures extending externally of the inner and outer walls; each pair of aligned tubular structures having coaxial openings; tubular necks unitary with the nozzle boxes, opening into the chambers of the latter, and extending through the inner wall tubular structure openings; tubular collars having their inner ends joined to the necks; annular welds joining the outer ends of the collars to the outer ends of the inner wall tubular structures; elastic fluid supply pipe sections extending through the outer wall tubular structure openings; annular joints unitarily connecting the outer ends of the outer wall tubular structures and the pipe sections; means for holding the pipe sections centered with respect to the inner ends of the outer wall tubular structure openings; telescopic joints connecting the pipe section inner end and neck outer end portions; said circumferential series of nozzle boxes having adjacent ends extending radially with respect to the turbine axis and which are spaced sufficiently to allow for circumferential expansion; cooperating lugs provided on the inner wall and on the nozzle boxes to maintain the latter in circumferential alignment; and cooperating lugs provided on the juxtaposed ends of each of the groups of the nozzle boxes to aid in maintaining alignment of the latter and to maintain the nozzle boxes of each group properly positioned with respect to the blading.

11. In an elastic-fluid turbine, a cylinder including an inner wall supported from an outer wall and a circumferential key connection for holding the walls against relative axial displacement, a rotor, blading carried by the inner wall and by the rotor, and means for supplying elastic fluid to the blading: said means comprising a circumferential series of nozzle boxes each including a chamber and a group of nozzles for supplying elastic fluid from the latter to the blading; aligned inner and outer wall tubular structures extending externally of the inner and outer walls; each pair of aligned tubular structures having coaxial openings; tubular necks unitary with the nozzle boxes, opening into the chambers of the latter, and extending through the inner wall tubular structure openings; tubular collars having their inner ends joined to the necks; annular welds joining the outer ends of the collars to the outer ends of the inner wall tubular structures; elastic fluid supply pipe sections extending through the outer wall tubular structure openings; annular joints unitarily connecting the outer ends of the outer wall boss structures and the pipe sections; means for holding the pipe sections centered with respect to the inner ends of the outer wall tubular structure openings; telescopic joints between the inner ends of the pipe sections and the outer ends of the tubular necks; and lugs carried by the inner wall and by the nozzle boxes for holding the latter in alignment.

GEORGE W. PENTHENY.

REFERENCES CITED

The following references are of record in the file of this patent:

UNITED STATES PATENTS

| Number | Name | Date |
|---|---|---|
| 2,112,738 | Doran | Mar. 29, 1938 |
| 2,278,304 | Conrad | Mar. 31, 1942 |
| 2,294,127 | Pentheny | Aug. 25, 1942 |
| 2,304,993 | Franck | Dec. 15, 1942 |
| 2,308,897 | Stearns | Jan. 19, 1943 |

FOREIGN PATENTS

| Number | Country | Date |
|---|---|---|
| 546,919 | Great Britain | Aug. 5, 1942 |